3,188,724
METHOD OF CONSTRUCTION
Max H. Bates, Dorr W. Miller, and Joseph Woveris, South Bend, Ind., assignors to The Bendix Corporation, a corporation of Delaware
Filed Feb. 8, 1963, Ser. No. 257,127
2 Claims. (Cl. 29—157.1)

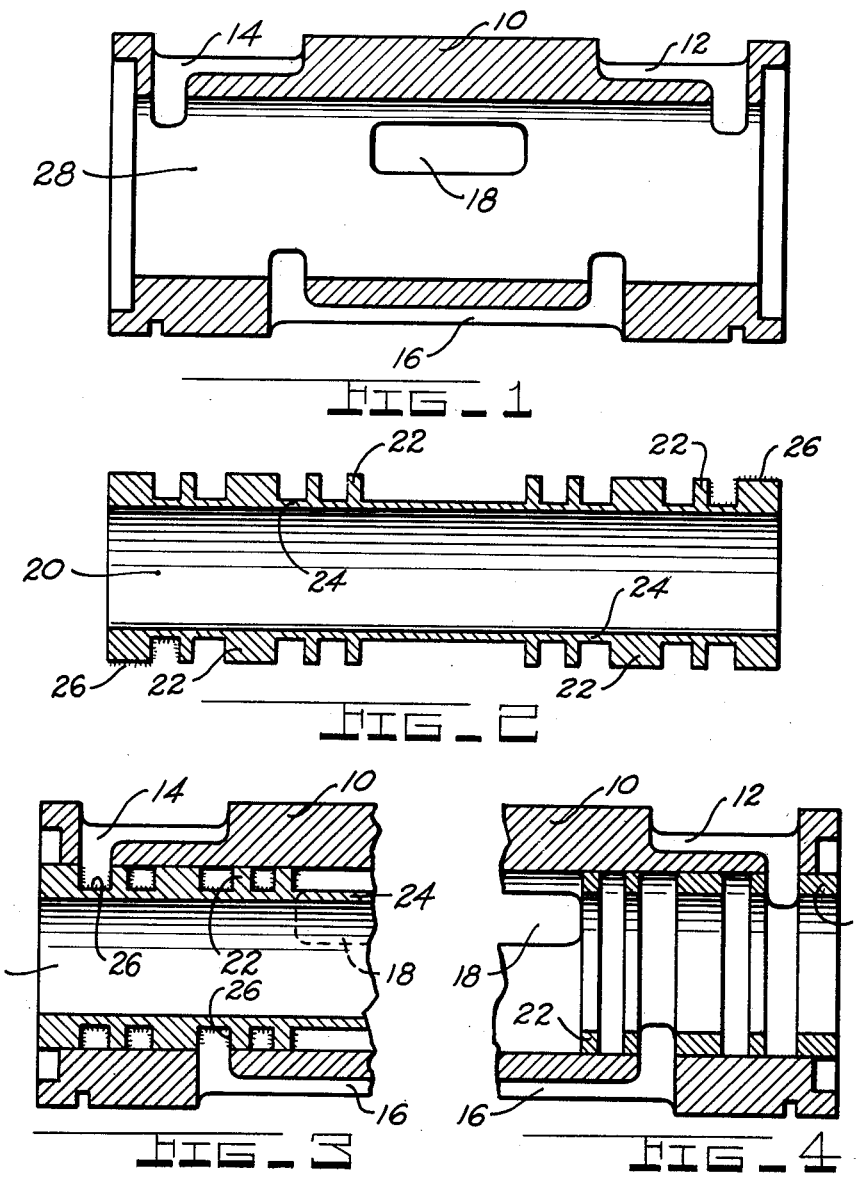

This invention relates to ways and means of construction of a valve housing with numerous land portions.

It is an object of this invention to provide a process of manufacturing a valve body or the like by a simple, economic method.

It is another object to provide a process of construction of a housing or the like which merely includes steps such as joining two members and removing unwanted portions thereof.

As may be readily appreciated by those skilled in the art to which this invention relates other objects will appear from the following description of the accompanying drawings in which:

FIGURE 1 shows a precision cast outer sleeve in section;

FIGURE 2 shows a machined inner sleeve in section;

FIGURE 3 shows the inner and outer sleeves assembled; and

FIGURE 4 shows the assembled inner and outer sleeve with a portion removed to form a valve housing in accordance with the principles of our invention.

Previous construction methods for small servo valves has been grounded in a so-called stacking process. This may be simply described by visualizing a plurality of tubular sections which are placed one on top of the other and silver soldered, copper brazed or held by compression between two nuts to provide one complete valve housing. Each section is individually cast and machined to provide land portions and ports leading from without to within said housing about said land portions. The tolerance requirements for matching such sections has required elaborate and expensive inspections and precise jigs for holding alignment during assembly. In addition, the stacked valve housing tends to separate under high pressures even when under compressive loading.

With our construction, however, valves can be made at over fifty percent reduction in cost, and the resulting housing is an integral unit which does not have bond joints in compression. More particularly, our method relates to first machining a piece of bar stock or better yet, precision casting an outer sleeve or housing 10 having appropriately located openings of various configurations such as in one such construction appeared as ports 12, 14, 16 and 18. Such precision casting may involve investment casting techniques and the like which are well known in the art to provide a precisely dimensioned form.

Next we have taken tubular stock and placed it on a machine lathe or the like and turn it to form an inner sleeve or tubular member 20 having radially projecting portions 22 spaced by a tubular wall 24. The machining of the sleeve 20 is preferably done while the sleeve is in an annealed condition, and instead of a tubular member being machined, one could just as easily machine bar stock which, after machining, would leave a core having radial projections.

After sleeve 20 has been turned to provide a predetermined amount of lands or portions 22, which may or may not be of similar configuration, the resulting inner sleeve is coated by a bonding medium or substance such as by copper plating, as at 26. However, such coating is very light. Then the inner sleeve is again turned to have the peripheral surface of the projecting portions machined to a diameter substantially the same as the internal diameter of chamber 28 of housing 10. This means that there is an interference fit when trying to insert sleeve 20 into chamber 28.

Thus, in assembling the inner sleeve to the outer sleeve, which assembly is shown in FIGURE 3, the inner sleeve is pressed into chamber 28 by any appropriate means such as clamps and the like; or the inner sleeve 20 may be shrunk, as by placing in a deep freeze, and then inserted in chamber 28. We have also contemplated heating the outer sleeve and cooling the inner sleeve to arrive at an assembly of the two, which method is practical when sleeve 20 has been over-sized to a greater degree than required for shrink fitting of the sleeves.

After assembling the sleeves as shown in FIGURE 3, the assembled unit is placed in a furnace or some other such source of uniform heat whereupon the copper plating or bonding substance is caused to flow to the peripheral surface of portions 22 by capillary attraction to bond sleeve 20 to the walls of chamber 28 and, thus, sleeve 10. As may be surmised the amount of bonding material applied is critical, so that after bonding there is no material left on the sides of the portions 22.

After brazing or bonding the assembled sleeves are annealed in a heat treating furnace or the like, and while in the annealed condition the tubular wall 24 or bar stock is removed as by boring, etching, etc., to leave a valve housing depicted by FIGURE 4 having depending spaced portions 22. If desired, the sleeve assembly can be heat treated to raise the material hardness to a high level, such as, for example, Rockwell "C" 60. This is a contemplated process when it is desired to control high pressure (4000 p.s.i.), high velocity flows. In any event, we have found the service life of the sleeve assembly to be greatly increased by such a heat treat process. As may be readily appreciated the heat treat process aforedescribed is accomplished at a temperature which is below that of the bonding temperature.

Thus, we have described a preferred form of construction. However, such a description is not to limit the scope attributable to our invention, for any such limitation is only to be derived from the appended claims.

We claim:

1. A method of construction comprising the following steps:
    forming an outer sleeve with an open ended chamber and locating radial ports through said sleeve into said chamber at the same time on predetermined points;
    machining an inner sleeve to have spaced radially projecting portions connected by a tubular wall which portions are located with reference to the predetermined points of said ports formed in said sleeve;
    coating the exterior of said inner sleeve with a bonding substance;
    machining said radially projecting portions to a diameter substantially the same as the internal diameter of the chamber of said outer sleeve which machining removes the peripheral coating of the bonding substance to provide a predictable peripheral dimension for said inner sleeve;
    press fitting said inner sleeve in said chamber of said outer sleeve such that said portions and said ports are operatively aligned;

heating the assembled inner and outer sleeves to cause said bonding substance to flow outwardly of said radially projecting portions and by capillary attraction into the area between the chamber wall and an exterior surface of said radially projecting portions; and removing said tubular wall of said inner sleeve to leave spaced depending projections in the chamber of said outer housing.

2. A method of construction according to claim 1 and further comprising the step of annealing said assembled inner and outer sleeve before removing said tubular wall.

References Cited by the Examiner

UNITED STATES PATENTS

| | | | |
|---|---|---|---|
| 1,357,739 | 11/20 | Steenstrup | 29—481 X |
| 2,016,878 | 10/35 | Vickers | 29—157.1 |
| 2,435,242 | 2/48 | Somes | 29—157.3 X |
| 2,554,008 | 5/51 | Burger. | |
| 2,704,882 | 3/55 | Olson | 29—558 X |
| 2,930,405 | 3/60 | Welsh | 29—157.3 X |

WHITMORE A. WILTZ, *Primary Examiner.*